(12) United States Patent
Matsunoshita

(10) Patent No.: US 8,054,498 B2
(45) Date of Patent: Nov. 8, 2011

(54) IMAGE PROCESSING APPARATUS, IMAGE FORMING APPARATUS AND COMPUTER READABLE MEDIUM

(75) Inventor: Junichi Matsunoshita, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1155 days.

(21) Appl. No.: 11/798,425

(22) Filed: May 14, 2007

(65) Prior Publication Data

US 2008/0100880 A1 May 1, 2008

(30) Foreign Application Priority Data

Oct. 31, 2006 (JP) ................................. 2006-297047

(51) Int. Cl.
  *G06F 15/00* (2006.01)
  *G06F 15/16* (2006.01)
(52) U.S. Cl. ...................................... 358/1.18; 709/217
(58) Field of Classification Search .................. 358/1.18, 358/1.13, 1.14, 1.15, 1.16, 3, 28, 3.28; 709/227, 709/217, 219, 223, 238; 235/462.32, 462.01, 235/462.16, 453; 379/93.12; 455/557
See application file for complete search history.

(56) References Cited

U.S. PATENT DOCUMENTS

| 5,715,382 A * | 2/1998 | Herregods et al. | ............ 358/1.18 |
| 2003/0179399 A1* | 9/2003 | Matsunoshita | ............... 358/1.13 |

FOREIGN PATENT DOCUMENTS

| JP | A 2001-346032 | 12/2001 |
| JP | A 2003-280469 | 10/2003 |
| JP | A 2006-101201 | 4/2006 |

OTHER PUBLICATIONS

Office Action issued Jun. 1, 2011 in JP Application No. 2006-297047 with English translation.

* cited by examiner

*Primary Examiner* — Saeid Ebrahimi Dehkordy
(74) *Attorney, Agent, or Firm* — Oliff & Berridge, PLC

(57) ABSTRACT

An image processing apparatus includes a background image generation section and a combining section. The background image generation section generates a background image containing new updated trace information that identifies at least one of the image processing apparatus and a user who instructs the image processing apparatus to form an image. The combining section combines the background image generated by the background image generation section with a foreground image to generate a composite image. The combining section outputs the composite image to an image forming section that forms an image on a recording medium. The background image generation section arranges the updated trace information in an end region of the background image.

14 Claims, 12 Drawing Sheets

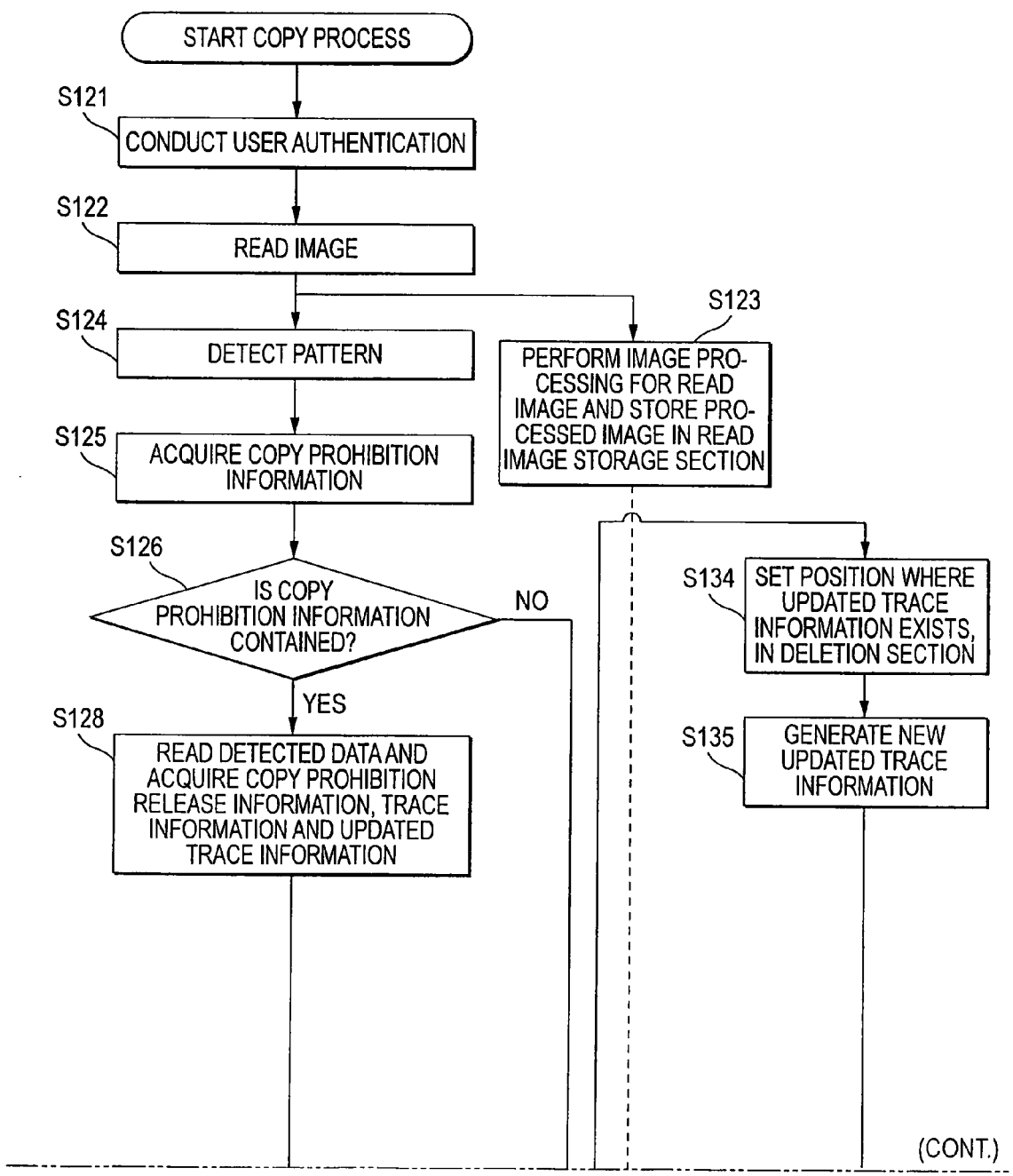

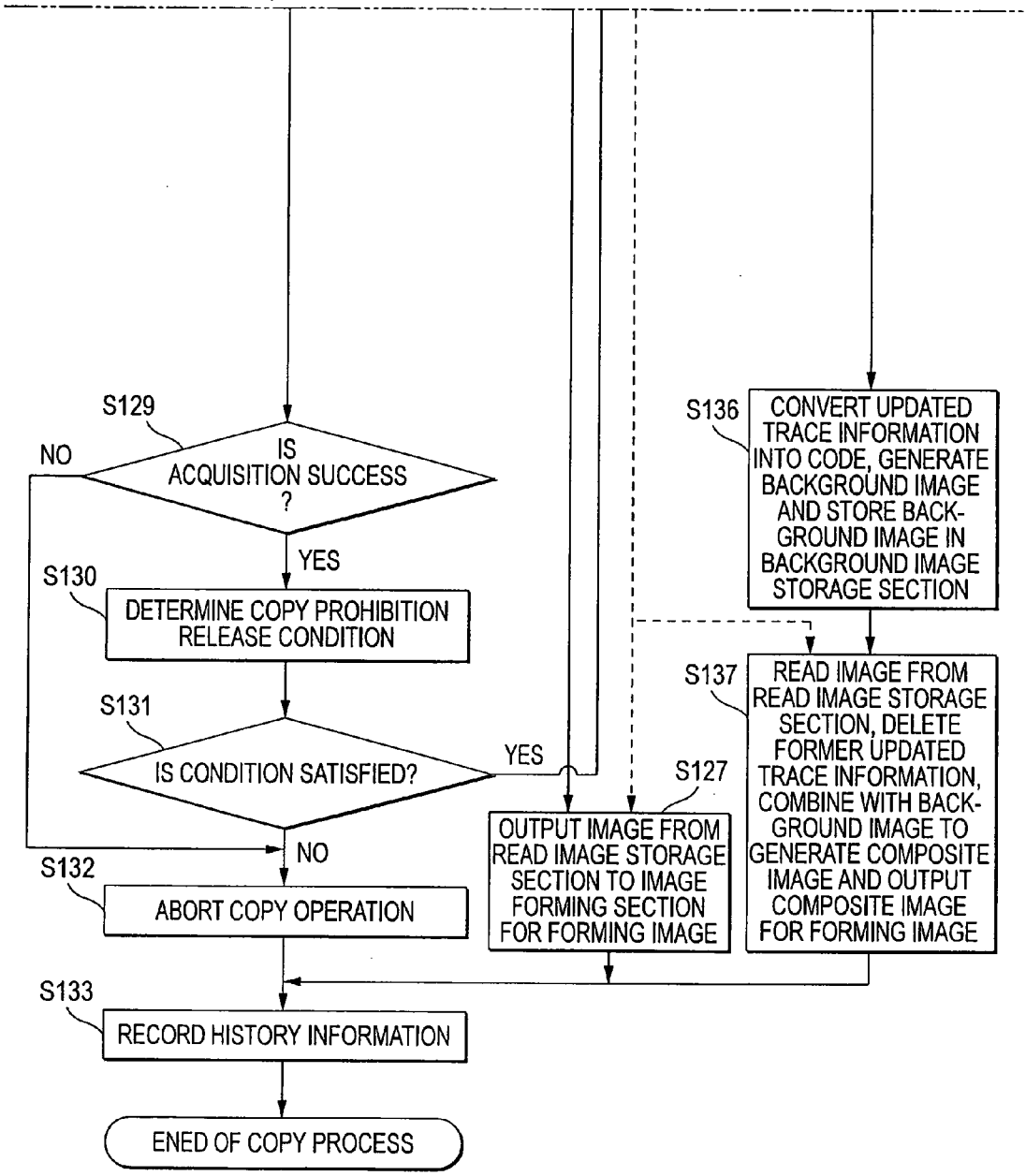

IMAGE PROCESSING APPARATUS, IMAGE FORMING APPARATUS AND COMPUTER READABLE MEDIUM

CROSS-REFERENCE TO RELATED APPLICATIONS

This application is based on and claims priority under 35 U.S.C. §119 from Japanese Patent Application No. 2006-297047 filed Oct. 31, 2006.

BACKGROUND

1. Technical Field

The invention relates to an image processing apparatus, an image forming apparatus, an image processing program, a computer readable medium storing the image processing program and a computer data signal.

2. Related Art

Recently, it has been made possible to easily reproduce a document, etc., with the widespread use of an image forming apparatus having a copying function, such as a personal computer, a printer, and a copier. On the other hand, information leakage as unauthorized copy of a secret document now becomes an issue.

SUMMARY

According to an aspect of the invention, an image processing apparatus includes a background image generation section and a combining section. The background image generation section generates a background image containing new updated trace information that identifies at least one of the image processing apparatus and a user who instructs the image processing apparatus to form an image. The combining section combines the background image generated by the background image generation section with a foreground image to generate a composite image. The combining section outputs the composite image to an image forming section that forms an image on a recording medium. The background image generation section arranges the updated trace information in an end region of the background image.

BRIEF DESCRIPTION OF THE DRAWINGS

Exemplary embodiments of the invention will be described below in detail with reference to the accompanying drawings, wherein:

FIG. 7 is a flowchart to show an operation example when copy is made;

DETAILED DESCRIPTION

Figure 1:
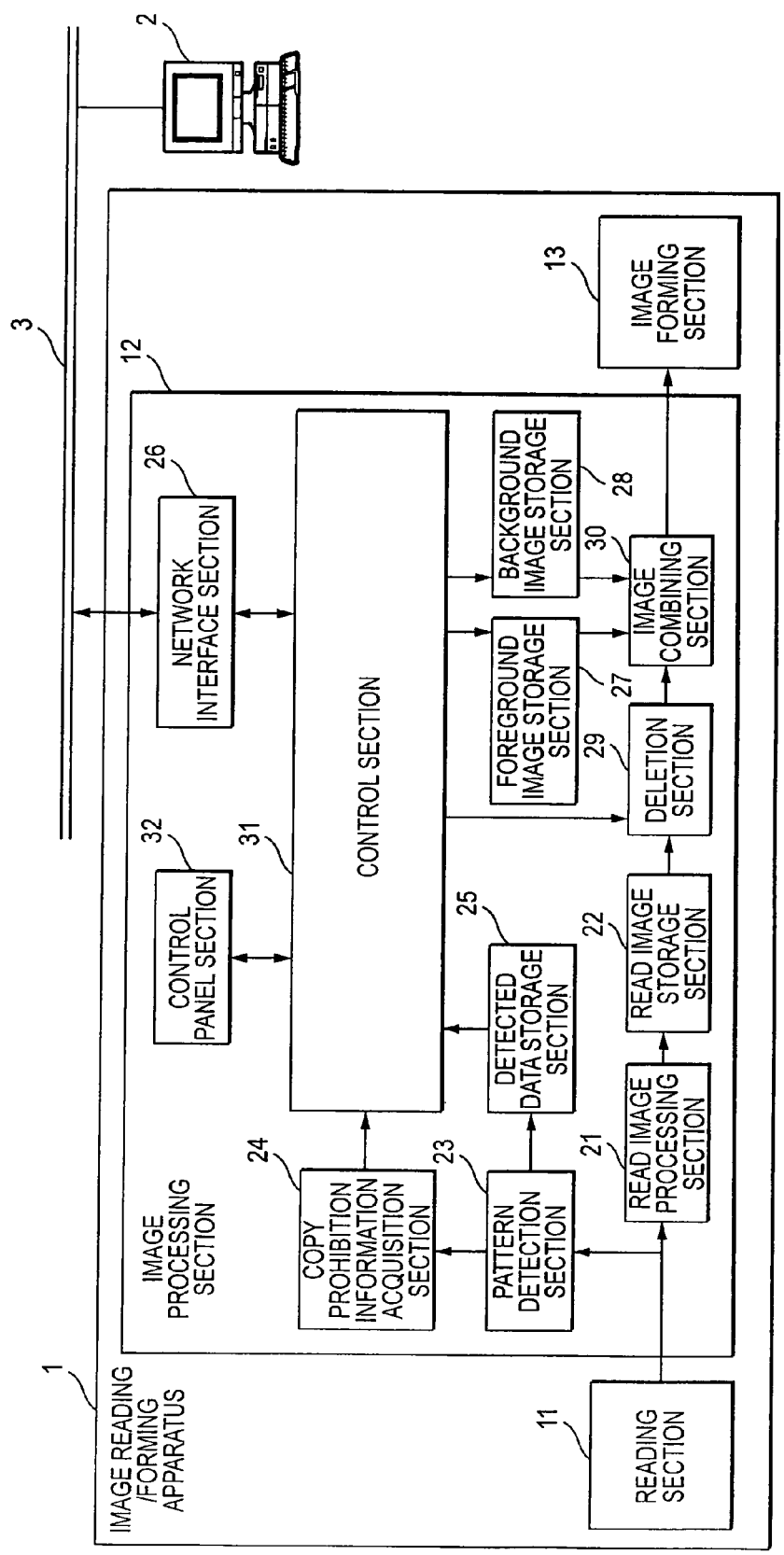
FIG. 1 is a block diagram to show an exemplary embodiment of the invention.

FIG. 1 is a block diagram to show one exemplary embodiment of the invention. In FIG. 1, numeral 1 denotes an image reading/forming apparatus, numeral 2 denotes a client, numeral 3 denotes a network, numeral 11 denotes a reading section, numeral 12 denotes an image processing section, numeral 13 denotes an image forming section, numeral 21 denotes a read image processing section, numeral 22 denotes a read image storage section, numeral 23 denotes a pattern detection section, numeral 24 denotes a copy prohibition information acquisition section, numeral 25 denotes a detected data storage section, numeral 26 denotes a network interface section, numeral 27 denotes a foreground image storage section, numeral 28 denotes a background image storage section, numeral 29 denotes a deletion section, numeral 301 denotes an image combining section, numeral 31 denotes a control section, and numeral 32 denotes a control panel section.

The image reading/forming apparatus 1 shown in FIG. 1 has a copying function independently. The image reading/forming apparatus 1 is connected to the network 3 and has at least a function of forming an image based on image data received through the network 3. In the description of the example shown in FIG. 1, it is assumed that the image data is sent from the client 2. Of course, the image reading/forming apparatus 1 may have any other function such as a scanner function of reading an image on an original and transferring the read image through the network 3, needless to say.

The image reading/forming apparatus 1 includes the reading section 11, the image processing section 12 and the image forming section 13. The reading section 11 reads an image on an original and sends the read image to the image processing section 12. The image forming section 13 forms the image sent from the image processing section 12 on a recording medium such as a sheet of paper, for example.

The image processing section 12 performs a process for the image read by the reading section 11, a drawing process based on the image data received through the network 3, etc., and outputs the post-processed image to the image forming section 13. Particularly, to prevent copying of the image formed by the image forming section 13, the image processing section 12 has a function of performing a process of superposing copy prohibition information, trace information and copy prohibition release information on the image read by the reading section 11 or the image data received through the network 3 and then output the resultant image data. When the reading section 11 reads the image on the original formed by superposing such copy prohibition information, trace information, copy prohibition release information and updated trace information that is added at a time when copy is made, the image processing section 12 has a function of acquiring the copy prohibition information, the trace information, the copy prohibition release information and the updated trace information from the read image, determining as to whether or not copying is permitted, controlling whether or not the image is to be output to the image forming section 13 and adding updated trace information newly created at the time when the copy is made.

In the example shown in FIG. 1, the image processing section 12 includes the read image processing section 21, the read image storage section 22, the pattern detection section 23, the copy prohibition information acquisition section 24, the detected data storage section 25, the network interface section 26, the foreground image storage section 27, the background image storage section 28, the deletion section 29, the image combining section 30, the control section 31 and the control panel section 32.

The read image processing section 21 performs various types of image processing for the image read through the reading section 11 so that the image becomes an optimum image to be formed by the image forming section 13. The read image storage section 22 temporarily stores the image processed by the read image processing section 21 when the image is output to the image forming section 13. When the image forming section 13 is allowed based on the copy prohibition release information to form an image whose copying is prohibited, the image stored in the read image storage section 22 becomes a foreground image.

From the image read through the reading section 11, the pattern detection section 23 detects a predetermined pattern embedded in the image and restores it to the original information (namely, "1" or "0"). A specific pattern of the predetermined pattern will be described later.

If the copy prohibition information indicating that copying is prohibited exists in the information of the predetermined pattern detected by the pattern detection section 23 in regions other than an end region of the image read by the reading section 11, the copy prohibition information acquisition section 24 acquires the copy prohibition information and sends the acquired copy prohibition information to the control section 31.

The detected data storage section 25 stores the data of the predetermined pattern detected by the pattern detection section 23. The data is used when the control section 31 acquires the copy prohibition release information and the trace information from a region other than the end region or further acquires the updated trace information from the end region.

The network interface section 26 communicates with a client 2, for example, through the network 3. Here, the network interface section 26 receives image data sent through the network 3. The image data may be data in an analyzable format such as data described in a printer description language (PDL), for example.

The foreground image storage section 27 stores foreground image data provided by the control section 31 based on the image data received by the network interface section 26. The foreground image data may also be used when the control section 31 performs the drawing process.

The background image storage section 28 stores a background image representing information of the copy prohibition information, the copy prohibition release information, the trace information and the updated trace information by a predetermined pattern. In the following description, the copy prohibition information, the copy prohibition release information, and the trace information may be collectively called "background information." As described later, at a first time when a certain image or at a first time when the certain image is copied, a background image representing the background information by the predetermined pattern is stored. Also, when an image to which the copy prohibition information is added is copied, a background image representing the updated trace information by a predetermined pattern is stored. The control section 31 generates the background images.

When copy prohibition of the copy-prohibited read image is released and the image forming section 13 forms an image, the deletion section 29 deletes the image of the updated trace information pattern in the end region from the image stored in the read image storage section 22, and sends the resultant image to the control section 31. Accordingly, if the read image contains the updated trace information, the updated trace information is deleted for making it possible to add new updated trace information. The image reading/forming apparatus may be configured to receive a position where the updated trace information pattern to be deleted is present, from the control section 31.

To form an image, with the image forming section 13, that is prohibited from being copied, the image combining section 30 combines the image stored in the read image storage section 22 or the image stored in the foreground image storage section 27 and the background image stored in the background image storage section 28 to generate a composite image and outputs the composite image to the image forming section 13. When copy prohibition of the copy-prohibited read image is released and the image forming section 13 forms an image, the image combining section 30 combines the image obtained by deleting the end region by the deletion section 29 from the image stored in the read image storage section 22 and an end region of the background image stored in the background image storage section 28, to generate a composite image and outputs the composite image to the image forming section 13. When normal copy is made or an image is formed normally, the background image is not combined.

The control section 31 performs not only internal control of the image processing section 12, but also control of the whole image reading/forming apparatus 1 including the reading section 11 and the image forming section 13. Particularly, the control section 31 has a control function to form an image that is prohibited from being copied and a control function to read a copy-prohibited original. As the control function to form an image that is prohibited from being copied, the control section 31 represents by a predetermined pattern background information containing the copy prohibition information indicating that copy is prohibited, the copy prohibition release information indicating a copy prohibition release condition, and the trace information indicating an output source that first forms an image and repeatedly places the background information on the entire face of the image. The control section 31 may further represent updated trace information described later by a predetermined pattern, place the updated trace information in an end region of the image to generate a background image and store the generated background image in the background image storage section 28. In this processing, the control section 31 also functions as a background image generation section.

The trace information includes, for example, a user ID that identifies a user who inputs an image formation instruction, a document name, a document ID, identification information of the apparatus for forming an image, date and time at which an image is formed, and/or information of a client 2 that transmits image data when an image is image data received through the network 3. The copy prohibition release information includes, for example, a personal identification number, a user ID of a user who is permitted to make a copy, date and time at which the copy is prohibited and/or machine number of an apparatus that is permitted to make a copy. Of course, any desired information may be contained as the trace information and the copy prohibition release information. At a first time when an image that is prohibited from being copied is formed, the trace information or dummy data may be used as the updated trace information.

As the control function to read a copy-prohibited original image, the copy prohibition information acquisition section 24 detects copy prohibition information, and if it is determined that copy is prohibited, further copy prohibition release information is acquired from the detected data stored in the detected data storage section 25 and it is determined as to whether or not the copy prohibition release condition is satisfied. In this process, the control section 31 also functions as a copy prohibition release information acquisition section that acquires the copy prohibition release information and a determination section that determines as to whether or not the copy prohibition release condition is satisfied. If the copy prohibition release condition is not satisfied as a result of determination of the condition, an image is not output to the image forming section 13 under the control of the control section 31.

If the copy prohibition release condition is satisfied, updated trace information is acquired from the detected data stored in the detected data storage section 25 and the acquired updated trace information and new updated trace information to be added are combined to generate updated trace information. A background image representing the updated trace information by a predetermined pattern is generated and is stored in the background image storage section 28. In this process, the control section 31 also functions as an updated trace information acquisition section and a background image generation section.

The updated trace information may be acquired with considering skew that is caused when the reading section reads an image. At this time, a position where the updated trace information exists is previously acquired and the deletion section 29 is informed of the position to use it in deleting the updated trace information in the read image, and also use it as position information when new updated trace information is converted into a code pattern and placed. Thereby, the pattern of the new updated trace information is superposed on the position where the former updated trace information pattern existed. If no updated trace information pattern exists and only dummy data exists, the position information of the dummy data may be acquired and a process may be performed in a similar manner.

The control section 11 causes the deletion section 29 to read the read image from the read image storage section 22 and deletes an image of the end region and causes the image combining section 30 to combine the image whose end region image has been deleted by the deletion section 29 and the end region of the background image stored in the background image storage section 28 to generate a composite image and outputs the composite image to the image forming section 13 for forming the image and executing copy.

The new updated trace information is generated by combining the updated trace information acquired from the read image and the updated trace information to be newly added during making of the current copy as described above. In addition, to generate the new updated trace information, updated trace information may be formed of only new information and may be combined with the read image as background information. In this case, the trace information, the former updated trace information, and the new updated trace information may be stored in association with each other. Of course, the associated information may be stored when the former updated trace information and new information to be added are embedded as the updated trace information. Further, the associated information and new updated trace information to be added may be combined to generate new updated trace information.

The control panel section 32 includes a display device, and an input device etc that serve as a user interface. For example, the control panel section 32 enables the user to input a copy execution instruction, and a user ID and personal identification number as a copy prohibition release condition. The control panel section 32 may also include an IC card reading device so that user authentication is conducted by reading an IC card.

Figure 2:
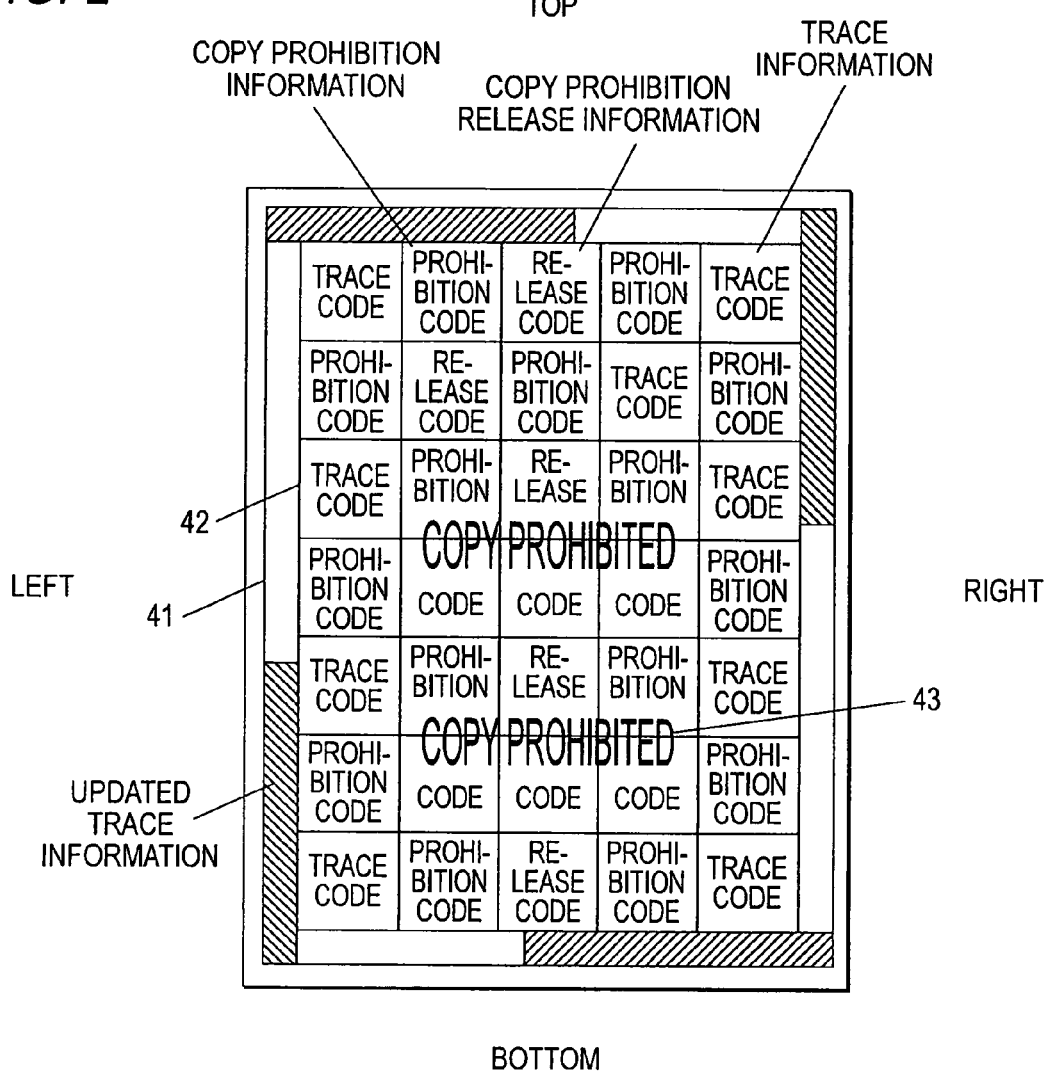
FIG. 2 is a schematic representation of a specific arrangement example of various pieces of information in a background image superposed on an image.

FIG. 2 is a schematic representation of a specific arrangement example of various pieces of information in a background image superposed on an image. In FIG. 2, numeral 41 denotes an end region, numeral 42 denotes an internal region, and numeral 43 denotes a latent image. To prohibit copy of an image formed in the image forming section 13, the control section 31 generates a background image and the image combining section 30 combines the background image with a foreground image to generate a composite image. To prohibit copy of a formed image that does not contain copy prohibition information, the copy prohibition information, the copy prohibition release information and the trace information are converted into a code pattern using a predetermined pattern and repeatedly arranged in the internal region 42 except the end region 41 for each block. In the example shown in FIG. 2, blocks of copy prohibition information (described as "prohibition code") are arranged checkerwise in alternate blocks from the upper left corner and blocks of trace information (described as "trace code") and blocks of copy prohibition release information (described as "release code") are arranged alternately between the copy prohibition information blocks. If the data amount of the trace information and the data amount of the copy prohibition release information are large, the trace information is embedded using two or more blocks. The blocks are repeatedly arranged, whereby if one pattern cannot be detected due to the affect of the foreground image, another pattern can be detected.

In the example shown in FIG. 2, the latent image 43 is contained in the background image. Hitherto, paper on which an image which will appear after copying although the human's eyes cannot recognize it (latent image) is printed has been used as a document that is prohibited from being copied. Recently, to form an image on normal paper, a latent image has been formed together without using special paper. In the example shown in FIG. 2, a text image of "copy prohibited" is contained in the background image as a latent image. The latent image is not recognized by the apparatus in copying and appears in the copy image so that the user can visually recognize it, to thereby suppress copy. Of course, no latent image may be contained in the background image or any other means for preventing copy may be adopted, needless to say.

The patterns of the copy prohibition information, the copy prohibition release information and the trace information thus arranged in the internal region 42 are combined with the foreground image and are repeatedly arranged. Thus it is difficult to falsify those information and an apparatus having a copy prohibition function would be able to reliably prohibit copy. If an image is copied with an apparatus having no copy prohibition function, the trace information pattern is also copied, so that the source can be traced.

The region between the internal region 42 and the edge of the recording medium (or the image) is the end region 41.

Updated trace information that is to be added to the trace information whose data pattern is arranged in the internal region 42 is converted into a code pattern and is arranged in the end region 41. If copy prohibition of a copy-prohibited image is released and the image is copied, the image in the internal region 42 is copied intact and the updated trace information existing so far in the end region 41 is deleted, and background information containing a predetermined pattern of new updated trace information is superposed. The size of the end region 41, etc., is arbitrary.

The pattern of the updated trace information is arranged in the end region 41 and dummy data is converted into a code pattern using a predetermined pattern and is arranged in extra portions of the end region 41. In FIG. 2, the portion where the updated trace information converted into a pattern is arranged is hatched. The pattern of the dummy data is arranged in each unhatched portion of the end region 41. As the dummy data, for example, random data, etc., may be used rather than various types of information used in this exemplary embodiment such as the copy prohibition information, the copy prohibition release information, the trace information, and the updated trace information. The pattern of the dummy data makes the pattern portion of the updated trace information hard to see visually.

The end regions 41 extend along the top, bottom, left, and right sides of a recording medium. The pattern of the updated trace information is arranged in the top, bottom, left, and right four end regions 41, whereby the updated trace information can always be acquired from the pattern existing in the leading end region of the image regardless of the orientation in which the original is placed or regardless of the direction in which reading of the original is started at the copying time. The end region 41 often becomes a blank space in the foreground image and the updated trace information can be reliably acquired. To update the trace information in the internal region 42, it is concerned that the image quality of the foreground image may be affected. Thus, the updated trace information is arranged in the end region 41, whereby the affect on the foreground image is lessened.

Alternatively, a comparison may be made between the updated trace information acquired from one end region 41 and that acquired from another end region 41. Thereby if the updated trace information in any end region is falsified, the illegal action can also be detected. Of course, if the updated trace information in any end region 41 cannot be acquired, the updated trace information may be acquired using any other end region 41.

Of course, if all updated trace information is not collected in one end region 41, for example, because the data amount of the updated trace information is large, the updated trace information may be collected using two or more end regions 41.

It is considered that such fraud may be made so that the end region 41 is placed out of the reading region at the copying time or that the end region 41 is cut out or erased as an unnecessary portion because of the margin. However, if the copy prohibition release information cannot be acquired from the end region 41, the information in the internal region 42 remains and at least an output source that has first formed the copy-prohibited image can be traced.

Figure 3A:
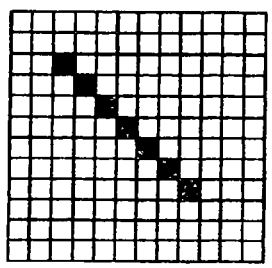
FIG. 3 is a schematic representation of examples of patterns.
Figure 3B:
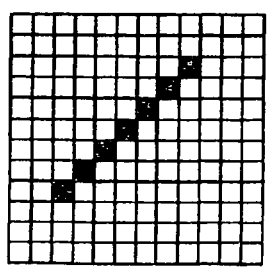

FIG. 3 is a schematic representation of examples of patterns. The pattern used in the exemplary embodiment represents "0" or "1" of information data as an image. The patterns shown in FIG. 3 are patterns also used in JP 2003-280469 A (corresponding to US 2003/0179399 A). If information data is "0," the pattern shown in FIG. 3A is used. If information data is "1," the pattern shown in FIG. 3B is used. Thereby, the information data can be replaced with the patterns. These patterns render the fact that information is embedded therein unrecognizable. In this specification, a process of replacing information "0" or "1" with a pattern may be called "converting into a (code) pattern."

Figure 3C:
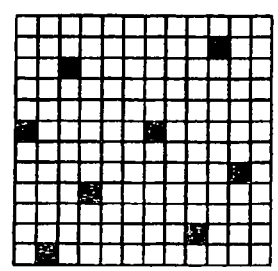

If the pattern shown in FIG. 3A and/or 3B is arranged in the latent image portion shown in FIG. 2, there is a possibility that the latent image portion will not function as a latent image. Thus, a pattern formed of dispersed dots as shown in FIG. 3C may be used in the latent image portion. Such a pattern may be used to generate a latent image, which will appear when copying is made, although the human eye cannot recognize such a pattern.

FIG. 4 is a schematic representation of examples of a part of a background image where plural patterns are arranged. M×N patterns shown in FIG. 3 are arranged in each of blocks where the background information pattern shown in FIG. 2 is arranged. The array of the M×N patterns forms a two-dimensional code to represent information. FIGS. 4A to 4C show examples of arranging patterns where M=N=10. The block size is not limited to the example, and any size such as M=N=20 patterns may be set. When a recording medium formed with an image is placed on the reading section 11 and is read, M=N is preferable because of the set orientation.

Figure 4A:
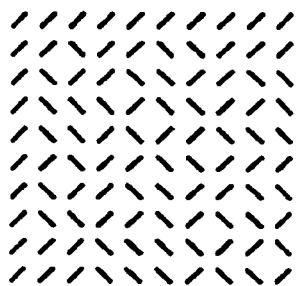
FIG. 4 is a schematic representation of examples of a part of a background image where plural patterns are arranged.

The example of the block shown in FIG. 4A is an example of arrangement of a pattern of copy prohibition release information and a pattern of trace information. The patterns corresponding to respective values ("1" or "0") of data of each of the copy prohibition release information and the trace information are arranged in a block. The left one column and the top one row in the figure are used as a synchronous pattern. The copy prohibition release information and the trace information are indicated by patterns except the synchronous pattern.

Figure 4B:
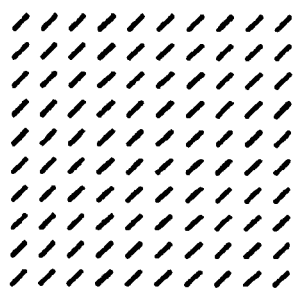
Figure 4C:
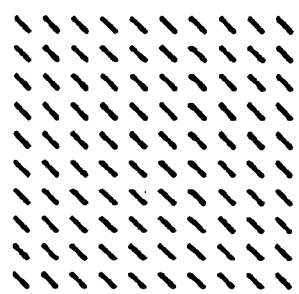

The examples of the blocks shown in FIGS. 4B and 4C show blocks in which a copy prohibition information pattern is arranged. Either of the blocks shown in FIGS. 4B and 4C may be adopted as the copy prohibition information pattern block. Alternatively, both the blocks may be mixed for use when another pattern arrangement block is used to indicate not copy-prohibited. In each of the block examples shown in FIGS. 4B and 4C, a special code having a feature different from the trace information pattern arrangement block shown in FIG. 4A is provided. This feature enables the copy prohibition information pattern block to be distinguished from the trace information pattern block.

Figure 4D:

The pattern array shown in FIG. 4D indicates an example of a pattern array of the updated trace information arranged in the end region 41. In this example, a width (the vertical direction in FIG. 4D) of the pattern array is shown as wide as four patterns. A length (the horizontal direction in FIG. 4D) of the pattern array depends on a length of a side of a recording medium. Also in this example, the left one column and the top one row are used as a synchronous pattern, and the pattern array other than the synchronous pattern provides the pattern of the trace information.

If the patterns shown in FIG. 3 are used as the background information pattern arranged in the internal region 42 and as the pattern of the trace information arranged in the end region 41 as shown in FIG. 4, a boundary therebetween does not appear and it is difficult for a user to distinguish from one region to the other region.

Of course, the patterns in FIG. 3 are shown by way of example, and other various patterns may be used. The pattern arrangement is not limited to the examples shown in FIG. 4. Furthermore, different patterns may be used for respective regions or respective information.

Next, an example of the operation in the exemplary embodiment of the invention will be described. In the following description, as a specific example, the patterns shown in FIG. 3 are arranged as shown in FIG. 4 and further the information patterns are arranged in the end region 41 and the internal region 42 as shown in FIG. 2.

Figure 5:
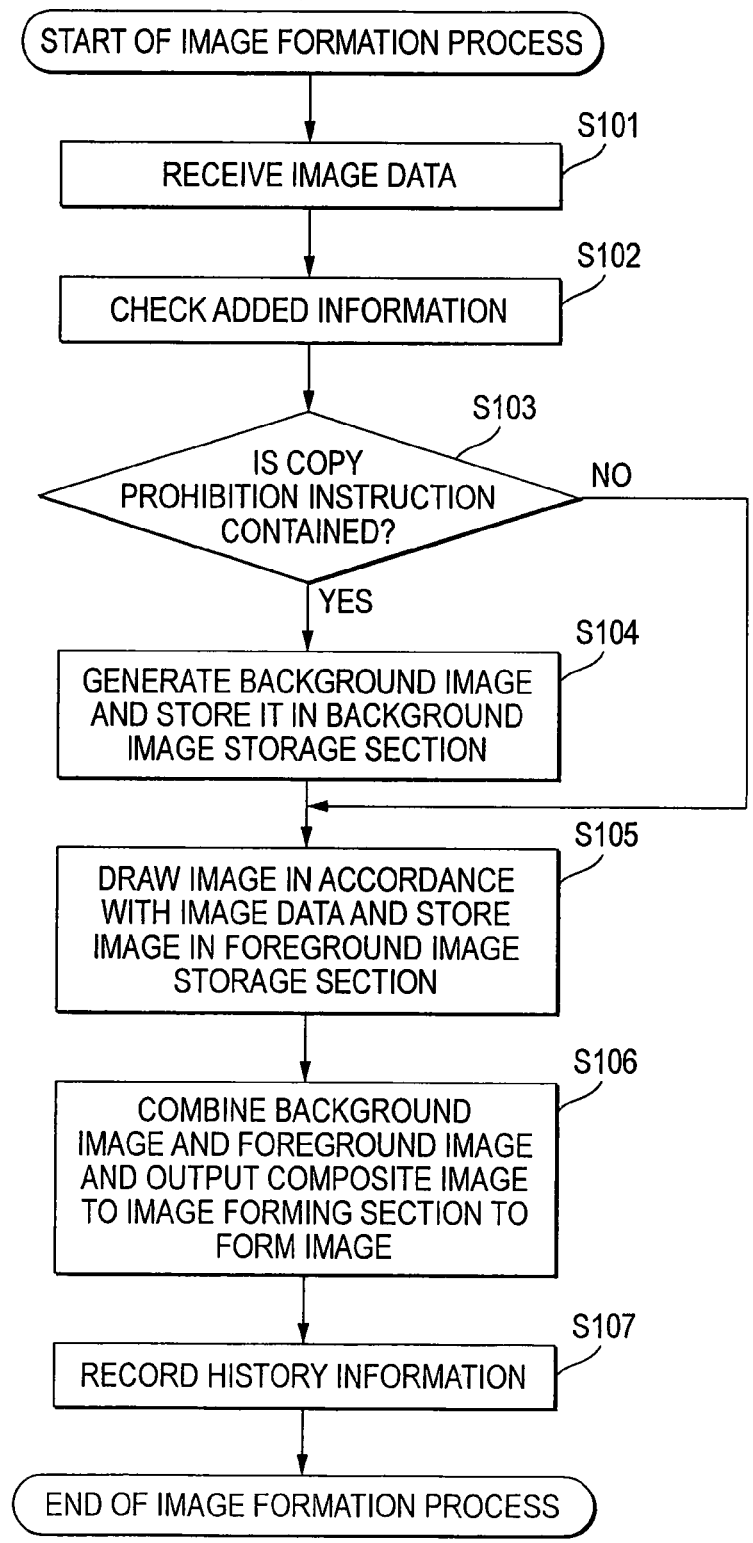
FIG. 5 is a flowchart to show an example of the operation for having first formed an image prohibited from being copied and received through the network 3.

FIG. 5 is a flowchart to show an example of the operation for having first formed an image prohibited from being copied and received through the network 3. At S101, the network interface section 26 receives image data sent from the client 2, for example, through the network 3 and sends the received image data to the control section 31. The received image data is stored in an internal memory (not shown) of the control section 31.

Information giving various instructions to form the image data on a recording medium is added to the received image data. The control section 31 checks the information added to the received image data at S102 and determines as to whether or not the information contains a copy prohibition instruction at S103. If the information does not contain a copy prohibition instruction, the control section 31 skips S104 and goes to S105 to form a normal image.

If the control section 31 determines at S103 that a copy prohibition instruction is contained, the control section 31 generates a background image and stores the background image in the background image storage section 28. A background image that is used when an image is newly prohibited from being copied is basically an image superposed on the internal region 42 in FIG. 2 and is an image containing the patterns of the copy prohibition information, the copy prohibition release information and the trace information. The trace information may contain various pieces of information such as information that is added when the image data is received at S101, information concerning a client 2 that transmits the image data, information concerning a user of the client 2, apparatus ID of the apparatus, date and time at which the image data is received and date and time at which an image is formed, as required. Here, further the updated trace information is converted into a code pattern and is contained in the end region 41 of the background information. The updated trace information at this time may be trace information or dummy data. The background image to be generated has a resolution responsive to the resolution of the image forming section 13 and is generated as binary data. An example of a process of generating the background image at S104 will be described later.

The control section 31 controls the image combining section 30 so as to combine the foreground image stored in the foreground image storage section 27 and the background image stored in the background image storage section 28 to generate a composite image. At this time, a color that is used when the binary background image is combined is set. For example, if the background image is combined with black, an image having a grayish background as a whole is formed. If the background image is combined with yellow, an image having a slightly yellowish background is formed. In this case, patterns become hard to recognize. To use any other color, the background is colored with the used color.

At S105, the control section 31 performs a drawing process in accordance with the image data received at S101, generates a foreground image, and stores the foreground image in the foreground image storage section 27. The drawing process may be preformed according to a known method.

At S106, the control section 31 gives an image formation instruction to the image forming section 13, which then forms an image. At this time, if an instruction of combining the foreground image and the background image is contained at S103, the image combining section 30 reads the foreground image stored in the foreground image storage section 27 and the background image stored in the background image storage section 28, combines the background image with the foreground image with the setup color to generate a composite image, and outputs the resultant composite image to the image forming section 13 in synchronization with the operation of the image forming section 13. Accordingly, the image forming section 13 forms an image in which the foreground image and the background image are combined. If the combining instruction is not given from the control section 31, the foreground image is read from the foreground image storage section 27 and is output to the image forming section 13. Accordingly, normal image formation is executed.

Upon completion of the image formation, at S107, an image formation history (log) is recorded. As the history information, information such as user identification information of a user who gives the image formation instruction which is extracted from the added information received together with the image data at S101, identification information of the client 2 which transmits the image data, identification information of the apparatus which executes the image formation, image formation date and time information, ID information of the history information, the number of image formation pages, the number of copies, information indicating color or monochrome and the image data main body may be recorded. Of course, any other information may be contained or some of the information may be recorded. The history information may be recorded in the internal storage unit (not shown) of the image reading/forming apparatus or may be transmitted through the network 3 to an external log management server to storage it.

In the description of the operation example given above, when the image forming section 13 forms an image based on the image data received through the network 3, the background image to prohibit copy is combined with the foreground image to form the composite image. In addition, for example, the background image to prohibit copy can also be combined with the image read through the reading section 11 to form a composite image if no pattern is embedded in the image to be read.

For example, if a user sets copy prohibition and enters a copy start instruction through the control panel section 32, the image read by the reading section 11 is processed by the read image processing section 21 and then is stored in the read image storage section 22. The fact that the pattern detection section 23 does not detect a predetermined pattern may be confirmed.

As at S106 in FIG. 5, the control section 31 generates the background image and stores the background image in the background image storage section 28. The copy prohibition information, the trace information and the copy prohibition release information which are required for generating the background image and a latent image as required may be set by the user through the control panel section 32 or may be preset by the administrator. To preset the information, variable information such as the user ID and the image formation date and time is acquired each time and is converted into a pattern.

When the image forming section 13 starts the image formation operation, the deletion section 29 reads the image stored in the read image storage section 22 (foreground image) and sends the read image to the image combining section 30 in synchronization with the operation of the image forming section 13. The image combining section 30 combines the background image stored in the background image storage section 28 with the image sent from the deletion section 29 (foreground image) with a setup color to generate a composite image and outputs the composite image to the image forming section 13. Accordingly, the image forming section 13 forms an image into which the image read through the reading section 11 and the background image are combined. If a copy prohibition instruction is not given, the copy operation containing a copy prohibition process (described later) is performed as a general copy command. Even if a copy prohibition instruction is given, when copy prohibition information exists in the read image, the copy operation containing the copy prohibition process (described later) is performed.

Figure 6:
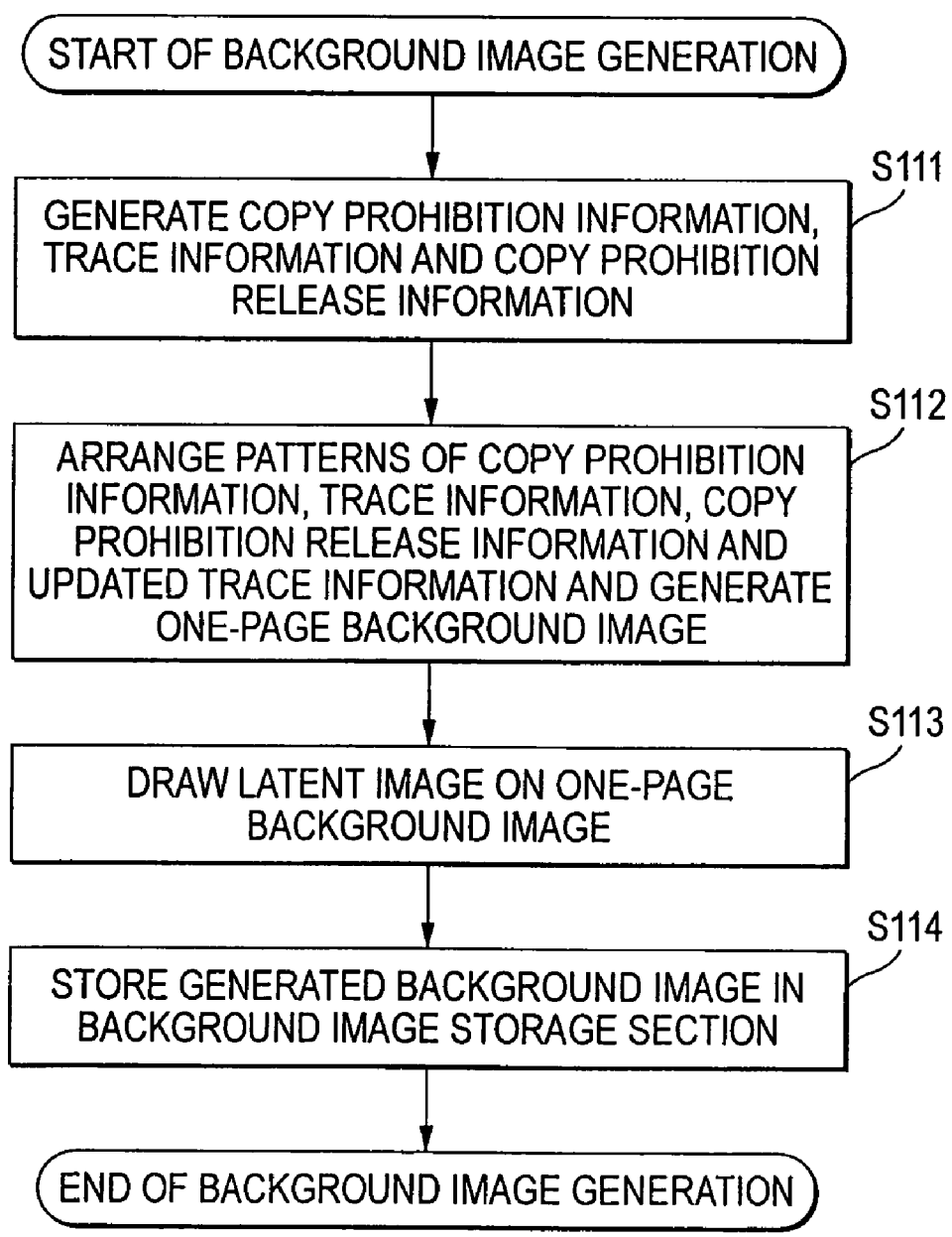
FIG. 6 is a flowchart to show an example of the process of generating the background image, which is superposed when an image prohibited from being copied has first been formed.

FIG. 6 is a flowchart to show an example of the process of generating the background image, which is superposed when an image prohibited from being copied has first been formed. As an example of the process of generating the background image by the control section 31 at S104 in FIG. 5, first at S111, copy prohibition information, trace information and copy prohibition release information are generated from the added information received together with the image data at S101 in FIG. 5, the current date and time, apparatus information of the apparatus and job identification information of the image formation.

At S112, the copy prohibition information, the trace information and the copy prohibition release information are converted into code patterns and are repeatedly placed in the internal region 42 in block units as previously described with reference to FIG. 2. In this example, the updated trace information is converted into a code pattern and is placed in the end region 41. Accordingly, one-page background information is generated. As the patterns, for example, patterns as shown in FIGS. 3A and 3B may be used. Using such patterns, uniform pattern blocks as shown in FIGS. 4B and 4C are created as the copy prohibition information. For the trace information and the copy prohibition release information, blocks where patterns are arranged in accordance with the information as shown in FIG. 4 are created. If the data amount is large, the trace information or the copy prohibition release information may be divided and arranged in two or more blocks. Further, for the updated trace information, the trace information is adopted as the updated trace information intact or dummy data is converted into a code pattern instead of the updated trace information and is arranged, for example, as shown in FIG. 4D and is contained in the background information. When the copy-prohibited image has been first formed, no updated trace information may be contained in the background information.

To form a latent image, at S113, a latent image is drawn on the background image generated at S112. The latent image may be a preset character string or pattern or a part of the trace information (user ID and date and time information). At this time, it is drawn as a pattern with dispersed dots as shown in FIG. 3C.

The background image thus generated is stored in the background image storage section 28 at S114. Thereafter, at S106 in FIG. 5, the image combining section 30 reads the background image from the background image storage section 28 and combines the background image with the foreground image. Then, the image forming section 13 forms a composite image.

FIG. 7 is a flowchart to show an operation example when copy is made. In this example, first at S121, the user who attempts to copy is authenticated. As an authenticating method, the user may be authenticated with an IC card, may be requested to input a user ID and a password through the control panel section 32 for authentication or may be authenticated using biometric identity verification such as fingerprint verification. The user may be authenticated in the beginning or by the time when the copy prohibition release condition is judged. For example, the user may be authenticated whenever necessary when copy prohibition is released.

At S122, when the user inputs a copy start instruction through the control panel section 32, the control section 31 sends a reading start instruction to the reading section 11, which then reads an image on an original. The read image is sent to the read image processing section 21. At S123, the image is subjected to image processing optimum to forming of a copy image and is stored in the read image storage section 22.

Figure 8:
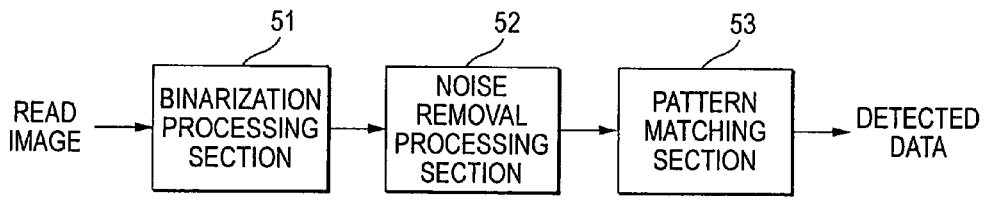
FIG. 8 is a block diagram to show one configuration example of the pattern detection section 23.
Figure 9:
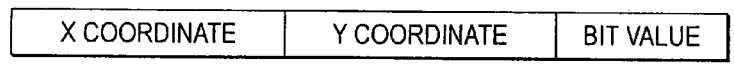
FIG. 9 is a schematic representation of an example of detected data.

The image read by the reading section 11 is also sent to the pattern detection section 23, and a copy prohibition process is performed concurrently with the read image process. At S124, the pattern detection section 23 detects specific patterns as shown in FIGS. 3A and 3B in sequence, and converts the detected patterns into data of "1" and "0". FIG. 8 is a block diagram to show one configuration example of the pattern detection section 23. FIG. 9 is a schematic representation of an example of the detected data. In FIG. 8, numeral 51 denotes a binarization process section, numeral 52 denotes a noise removal process section, and numeral 53 denotes a pattern matching section. The binarization process section 51 binarizes the image output from the reading section 11. Then, the noise removal process section 52 removes noise images (also containing the foreground image) other than the slanting line patterns shown in FIGS. 3A and 3B from the binary image. Then, the pattern matching section 53 performs a collation processing with using the patterns shown in FIGS. 3A and 3B as a template. Accordingly, the slanting line patterns shown in FIGS. 3A and 3B can be detected.

Whenever one pattern is detected, detected data shown in FIG. 9 is generated and is input to the copy prohibition information acquisition section 24 and is also stored in the detected data storage section 25. The detected data includes X and Y coordinates indicating where the pattern is detected and data "1" or "0" corresponding to the detected pattern.

Figure 10:
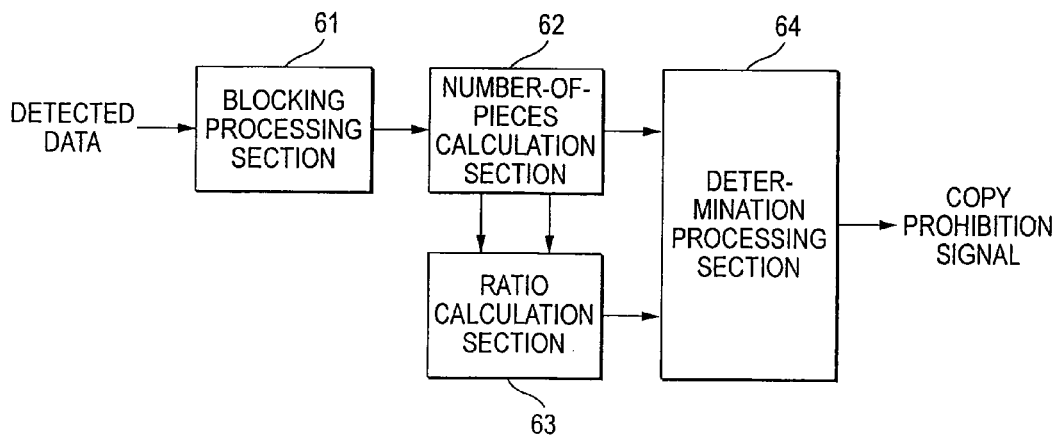
FIG. 10 is a block diagram to show a configuration example of the copy prohibition information acquisition section 24.

Referring again to FIG. 7, at S125, the copy prohibition information acquisition section 24 acquires copy prohibition information from the detected data sent from the pattern detection section 23 if copy prohibition information exists. FIG. 10 is a block diagram to show a configuration example of the copy prohibition information acquisition section 24. In FIG. 10, numeral 61 denotes a blocking process section, numeral 62 denotes a number-of-pieces calculation section, numeral 63 denotes a ratio calculation section, and numeral 64 denotes a determination process section. If the copy prohibition information is a pattern array shown in FIG. 4B or 4C, it is obviously different from the pattern array of the added information shown in FIG. 4A. Thus, even if some patterns cannot be detected, the presence of the copy prohibition information can be recognized so long as the pattern trend in the block is extracted. FIG. 10 shows the configuration for this purpose.

In the configuration of the copy prohibition information acquisition section 24 shown in FIG. 10, the blocking process section 61 reads, from the detected data storage section 25, detected data contained in each detected size in units of detected block size, which is smaller than the block size of each pattern, preferably equal to or less than a half of the block size. The number-of-pieces calculation section 62 calculates the number of pieces having the value "1" and the number of pieces having the value "0" from the detected data in the read detected block. The ratio calculation section 63 calculates the ratio between the number of pieces having the value "1" and the number of pieces having the value "0" calculated by the number-of-pieces calculation section 62. If the number of pieces of the detected data in the detected block calculated by the number-of-pieces calculation section 62 is in a predetermined range and the ratio of the number of pieces of the detected data having the value "0" or the ratio of the number of pieces of the detected data having the value "1" is equal to or greater than a predetermined threshold value, the determination process section 64 determines that the detected block is in the copy prohibition information block, and counts the number of blocks determined to be in the copy prohibition information block. When the number of the detected blocks becomes equal to or greater than a predetermined threshold value, the determination process section 64 determines that the image is a copy-prohibited image containing the copy prohibition information, and outputs a copy prohibition signal to the control section 31.

At S126 in FIG. 7, the control section 31 determines as to whether or not the copy prohibition information acquisition section 24 has acquired copy prohibition information, in the above-described example, determines as to whether or not a copy prohibition signal is input from the copy prohibition information acquisition section 24. If copy prohibition information is not acquired by the time when the reading section 11 has completed reading one-page image, the image forming section 13 is started and the image stored in the read image storage section 22 is read in synchronization with the operation of the image forming section 13 and is sent to the image forming section 13 for forming an image at S127. At this time, the process of deleting the end region by the deletion section 29 and the process of combining by the image combining section 30 are not performed. In the copy operation when copy is not prohibited, a background image can also be generated and superposed as previously described with reference to FIG. 5. In this case, at least the updated trace information pattern is superposed regardless of whether or not the copy prohibition information exists in the read image.

If it is determined at S126 that copy prohibition information has been acquired, namely, if a copy prohibition signal is input from the copy prohibition information acquisition section 24 to the control section 31, the detected data is read from the detected data storage section 25 and copy prohibition release information and trace information are acquired from the detected data in the internal region 42 and updated trace information is acquired from the detected data in the end region 41 at S128. When the updated trace information is acquired, position information of a position where the updated trace information exists (position coordinates, horizontal and vertical size, tilt angle, etc.,) is also acquired. The process of acquiring the updated trace information will be described later in detail.

At S129, the control section 31 determines as to whether or not the respective information has been reconstructed at S128. If the respective information cannot be reconstructed, the copy operation is aborted at S132. If it is determined at S129 that the copy prohibition release information has been reconstructed, the control section 31 determines the copy prohibition release condition indicated by the copy prohibition release information at S130. The control section 31 determines as to whether or not the copy prohibition release condition indicated by the copy prohibition release information is satisfied. The copy prohibition release condition may include various conditions relating to the user ID of the user authenticated at S121, the personal identification number input by the user through the control panel section 32 and the current date and time.

At S131, the result of the determination at S130 is determined. If it is not determined that the copy prohibition release condition is satisfied, the copy operation is aborted at S132. If it is determined at S131 that the copy prohibition release condition is satisfied, the existence position information of the updated trace information pattern detected when the updated trace information is acquired at S128 (position coordinates, horizontal and vertical size, tilt angle, etc.,) is set in the deletion section 29 as deletion region information at S134.

At 5135, new updated trace information in the current copy is generated. The updated trace information may contain the updated trace information existing so far acquired at S128 so that a copy history is seen from the updated trace information.

Figure 11:
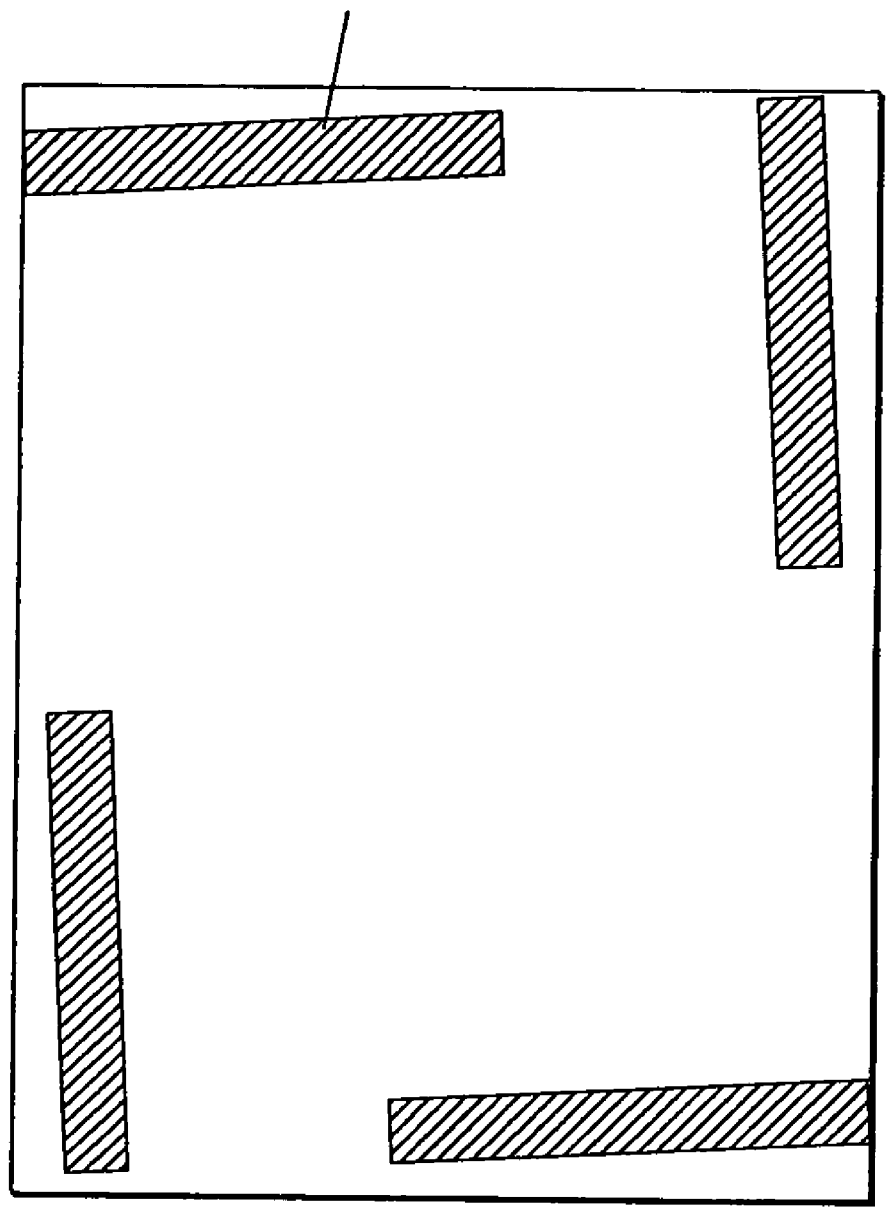
FIG. 11 is a schematic representation of an example of the background image generated in the end region.

At S136, for the new updated trace information generated at S135, the patterns shown in FIGS. 3A and 3B are arranged as shown in FIG. 4D, for example, whereby a background image in the end region 41 is generated and is stored in the background image storage section 28. When the updated trace information is converted into a code pattern and a background image is generated, the existence position information of the updated trace information pattern detected when the updated trace information is acquired at S128 is used to superpose the new updated trace information on the position of the former updated trace information (and dummy data following it). A position shift or a slight inclination may occur in the image read through the reading section 11. The background image containing the updated trace information pattern to be newly superposed is generated in response to the position shift, the inclination, etc., of the read image. FIG. 11 is a schematic representation of an example of the background image generated in the end region. FIG. 11 shows an example wherein a background image where new updated trace information patterns are arranged in hatched positions is generated.

At S137 in FIG. 7, the image forming section 13 is started and the deletion section 29 reads the image stored in the read image storage section 22 in synchronization with the operation of the image forming section 13, deletes the former updated trace information existing at the position specified by the control section 31, and sends the resultant image to the image combining section 30, which then combines the image sent from the deletion section 29 and the background image stored in the background image storage section 28 to generate a composite image and sends the composite image to the image forming section 13 for forming an image. At this time, in the region of the background image where the new updated trace information pattern is arranged at S136, the former updated trace information is deleted from the read image by the deletion section 29. Thus, the new updated trace information pattern is superposed on the deletion region and the updated trace information is rewritten.

In either of the case where the image is formed at S127 or S137 and the case where the copy operation is canceled at S132, history information of the copy operation is recorded at S133 and the copy process is terminated. The history information for the case where the image is formed at S127 and that for the case where the copy operation is canceled at S132 are similar to the history information at S107 in FIG. 5. When the copy operation is canceled at S132, information indicating that the copy operation is canceled is also contained. If copy prohibition of an image that contains the copy prohibition information is released and the image is copied at S137, the trace information and the updated trace information acquired at S128 and new information added to the updated trace information are associated with each other and are stored as history information. This information makes it possible to trace the copy route. The history information may be stored in the apparatus or may be stored in an external server. Of course, any desired information may be contained as the history information and the information may be associated with each other according to any desired method and the associated information may be contained in the history information.

Figure 12:
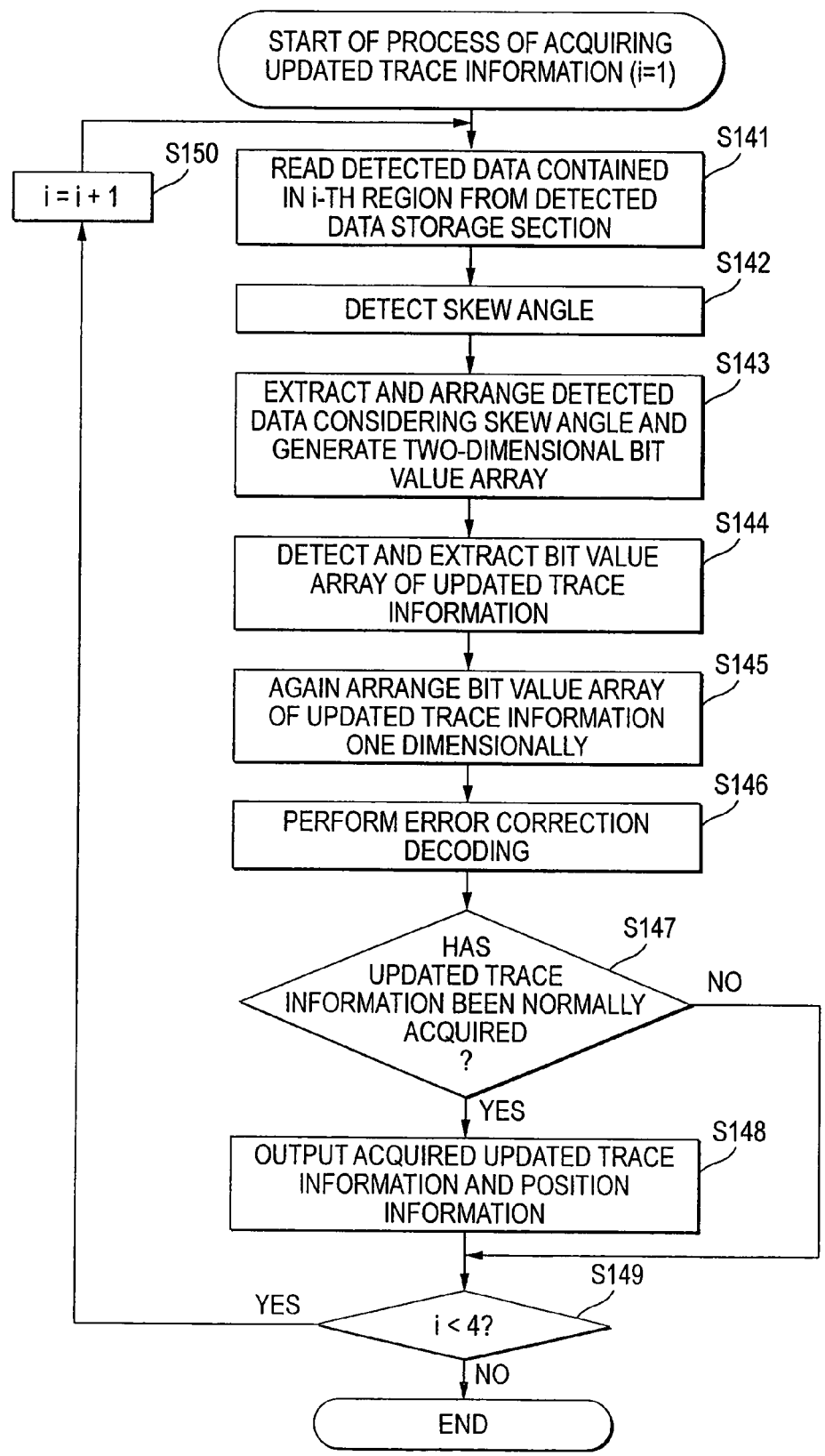
FIG. 12 is a flowchart to show an example of the process of acquiring updated trace information.
Figure 13:
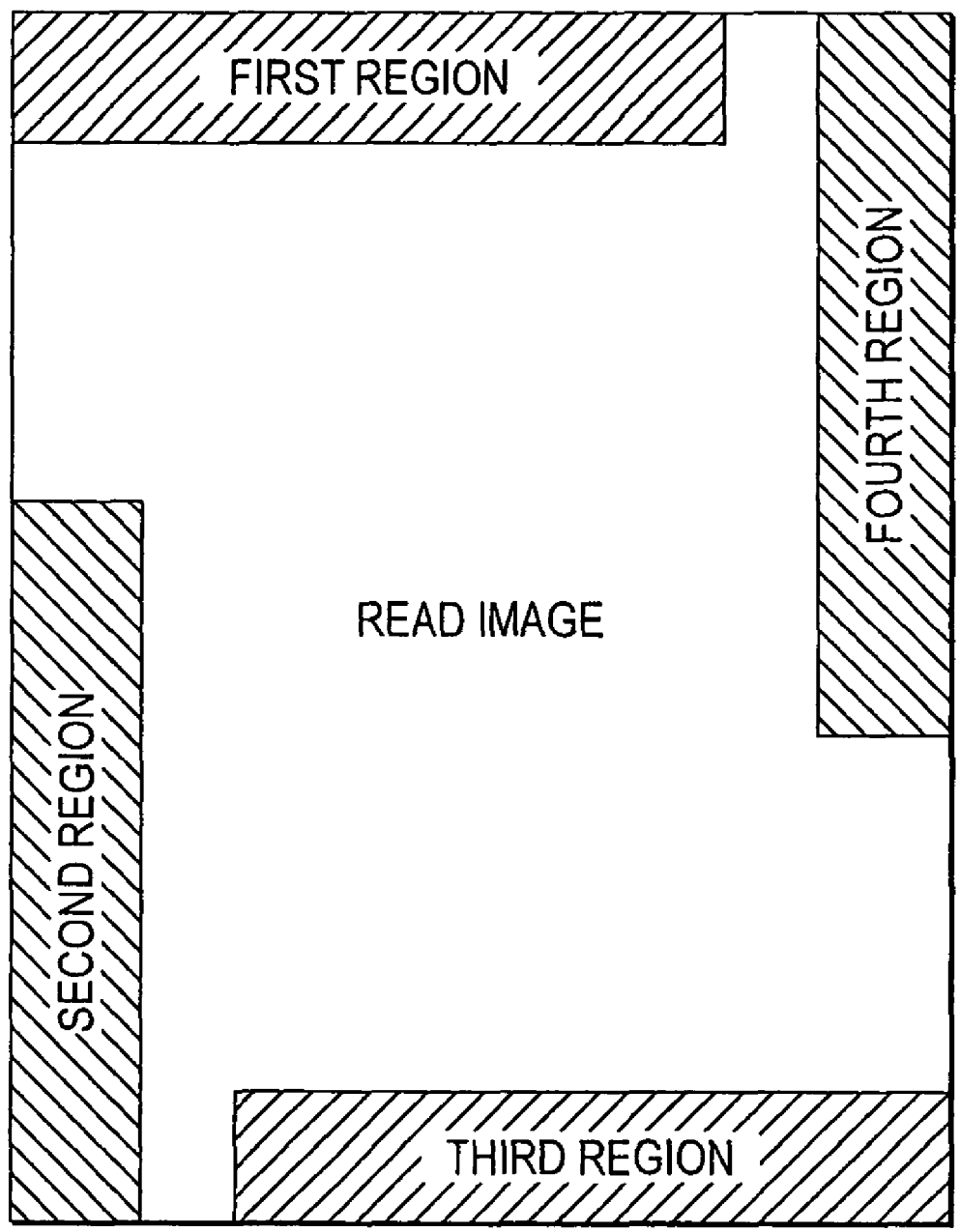
FIG. 13 is a schematic representation of an example of reference regions for performing the process of acquiring the updated trace information.

FIG. 12 is a flowchart to show an example of the process of acquiring the updated trace information, and FIG. 13 is a schematic representation of an example of reference regions for performing the process of acquiring the updated trace information. The process shown in FIG. 12 can be executed as a part of the process performed at S128 in FIG. 7. Since the updated trace information is arranged in each of the end regions existing on four sides of the image read through the reading section 11 as previously described with reference to FIG. 2, a region where the pattern of the updated trace information arranged in each end region is expected to exist is set as a reference region for performing the process of acquiring the updated trace information for the read image. The updated trace information is acquired from each reference region. In the following description, first to fourth regions as shown in FIG. 13 are adopted as the reference regions and the process of acquiring the updated trace information is performed. It is assumed that the initial value of a variable i is equal to 1, and reference is made starting at the first region.

At S141, the detected data contained in an i-th region is read from the detected data storage section 25. At S142, a skew angle of the image is found from a position (X, Y coordinates) of the detected data read at S141. As a technique of finding the skew angle, for example, Haff transformation may be used.

At S143, the detected data is acquired in order in the row and column directions considering the skew angle found at S142 to generate values in the detected data as a two-dimensional bit value array. For example, the detected data in the coordinates nearest to the origin is set to the starting point and a process of acquiring the detected data at predetermined intervals in the skew angle direction is repeated and a two-dimensional bit value array can be generated from the bit values of the obtained detected data.

At S144, the bit value array of the updated trace information is extracted from the two-dimensional bit value array generated at S143. For example, if the updated trace information pattern is arranged as shown in FIG. 4D, the detected data of the synchronous pattern existing at the top and the left is examined, whereby the portion of the updated trace information can be determined.

At S145, the bit value array extracted at S144 is again arranged one dimensionally. Generally, when the updated trace information is converted into a code pattern and is arranged, an error correction code may be added. In such a case, the former updated trace information is acquired using the error correction code at S146. Dummy data is eliminated.

At S147, it is determined as to whether or not the updated trace information has been normally acquired. If the updated trace information has been normally acquired, the acquired updated trace information and the position information of the position where the updated trace information exists are output at S148 and the process goes to S149.

After the updated trace information and the position information are output at S148 or if it is not determined at S147 that the updated trace information has been normally acquired, whether or not i<4, namely, whether or not the four reference regions have been processed is determined at S149. If an unprocessed reference region exists, i is incremented by one at S150 and the process returns to S141. Accordingly, a process of acquiring the updated trace information from the next reference region is performed. If the copy prohibition release information has been normally acquired in any reference region, the process terminates normally. When the process has been performed in all reference regions, it is terminated.

The copy process for the copy-prohibited image shown in FIG. 7 may also be applied to the case where a bit map image is sent via the network 3 and an image is formed, for example. In this case, the sent image may be processed as the input image through the reading section 11 is processed. Of course, similar processing can also be performed through another interface not shown.

In addition, for example, the apparatus may have a function of transferring an image read through the reading section 11 to the client 2 via the network 3 and a FAX transmission-reception function. To transfer the image read through the reading section 11 through the network 3 and execute FAX transmission, the copy prohibition function can be applied as with the copy described above and if copy is prohibited, transfer to the network 3 and FAX transmission can be canceled. When the copy prohibition is released, an image to which new updated trace information is added may be transferred or FAX transmitted. For an image received via FAX, it is also possible to combine a background image for copy prohibition or if image quality is good, the copy prohibited image may be processed.

Figure 14:
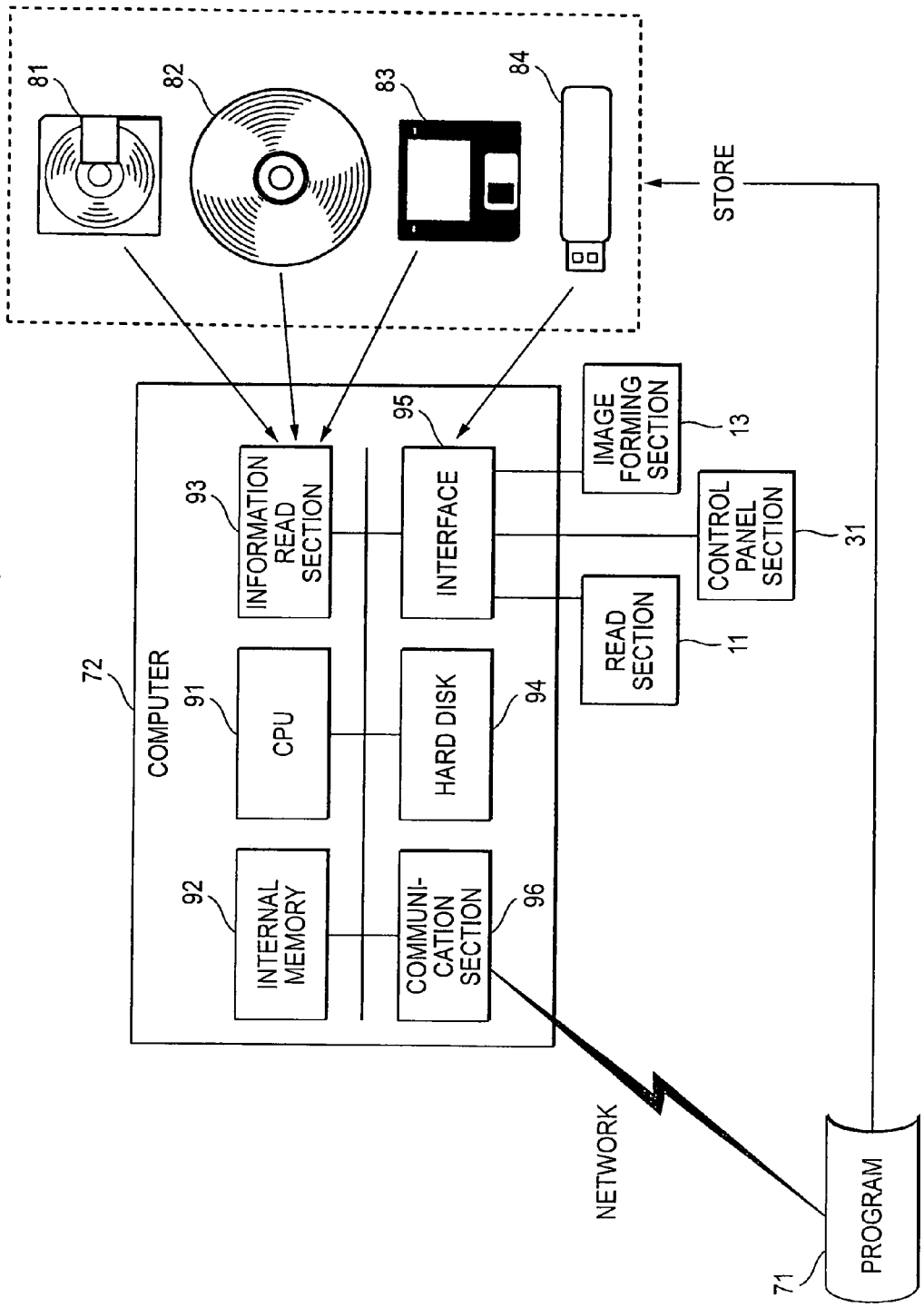
FIG. 14 is a schematic representation of an example of a computer program, a storage medium storing the computer program, and a computer when the function of the image processing section is implemented as the computer program.

FIG. 14 is a schematic representation of an example of a computer program, a storage medium storing the computer program, and a computer when the function of the image processing section is implemented as the computer program. In the figure, numeral 71 denotes a program, numeral 72 denotes a computer, numeral 81 denotes a magneto-optical disk, numeral 82 denotes an optical disk, numeral 83 denotes a magnetic disk, numeral 84 denotes memory, numeral 91 denotes a CPU, numeral 92 denotes internal memory, numeral 93 denotes an information reading section, numeral 94 denotes a hard disk, numeral 95 denotes an interface, and numeral 96 denotes a communication section.

Some or all of the functions of the control section 31 or further the functions of the read image processing section 21, the pattern detection section 23, the copy prohibition information acquisition section 24, the deletion section 29 and the image combining section 30 in the image processing section 12 described above in the exemplary embodiment can be implemented as the program 71 that can be executed by a computer. In this case, the program 71, the data used by the program, and the like can also be stored in a computer-readable storage medium. Of course, some functions can also be implemented as hardware or all may be implemented as hardware. For example, all or some of the read image processing section 21, the pattern detection section 23, the copy prohibition information acquisition section 24, the deletion section 29 and the image combining section 30 and some of the functions of the control section 31 can also be implemented as dedicated hardware.

The storage medium for storing the program 71 is a medium that can cause a change state of energy of magnetism, light, electricity, etc., to occur in the information reading section 93 included in the hardware resources of the computer in response to the description of the program and can transfer the description of the program to the reader in the format of the signal corresponding to the change state. For example, the storage medium is the magneto-optical disk 81, the optical disk 82 (containing a CD, a DVD, etc.,), the magnetic disk 83, the memory 84 (containing an IC card, a memory card, etc.,), etc. Of course, the storage media are not limited to portable media.

The program 71 is stored in any of the storage media and the storage medium is placed in the information reading section 93 or the interface 95 of the computer 72, for example, whereby the program 71 is read from the computer 72 and is stored in the internal memory 92 or on the hard disk 94 and is executed by the CPU 91, whereby some or all of the functions of the control section 31 or further the functions of the read image processing section 21, the pattern detection section 23, the copy prohibition information acquisition section 24, the deletion section 29 and the image combining section 30 in the image processing section 12 can be implemented. Alternatively, they may be implemented by transferring the program 71 to the computer 72 through a network, etc., receiving the program 71 at the communication section 96 of the computer 72, storing the program 71 in the internal memory 92 or on the hard disk 94, and executing the program 71 by the CPU 91, or they may be implemented by internally installing memory such as ROM into which the program 71 is previously written.

The reading section 11, the image forming section 13, and the control panel section 32 are connected through the corresponding interface 95. In addition, various units can be connected to the computer 72 through the interface 95. The read image storage section 22, the detected data storage section 25, the foreground image storage section 27, the background image storage section 28, etc., can be implemented using the hard disk 94, the internal memory 92, etc. Further, the network interface section 26 corresponds to the communication section 96.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be indicated by the following claims and their equivalents.

What is claimed is:

1. An image processing apparatus comprising:
a background image generation section that generates a background image containing new updated trace information that identifies at least one of the image processing apparatus to which an image formation instruction is provided and a user who instructs the image processing apparatus to form an image; and
a combining section that combines the background image generated by the background image generation section with a foreground image to generate a composite image, the combining section that outputs the composite image to an image forming section that forms an image on a recording medium, wherein:
the background image generation section arranges the updated trace information in an end region of the background image.

2. The apparatus according to claim 1, wherein the background image generation section generates the background image containing the trace information using a pattern associated with a pattern that is used for copy prohibition information.

3. The apparatus according to claim 1, further comprising:
an interface section that receives image data through a network; and
a control section that generates the foreground image based on the received image data.

4. The apparatus according to claim 1, further comprising:
an updated trace information acquisition section that acquires updated trace information from an end region of the foreground image; and
a deletion section that deletes an image in the end region of the foreground image, wherein:
the background image generation section that adds information that identifies the at least one of the image processing apparatus and the user who instructs the image processing apparatus to form the image to the updated trace information acquired by the updated trace information acquisition section, to generate the new updated trace information, and the combining section superposes the background image on the end region of the foreground image.

5. The apparatus according to claim 1, further comprising:
a trace information acquisition section that acquires, from the foreground image, trace information indicating a source that forms the foreground image, wherein:
the background image generation section generates the background image including the new updated trace information associated with the trace information acquired by the trace information acquisition section.

6. The apparatus according to claim 1, further comprising:
a trace information acquisition section that acquires, from the background image, trace information indicating a source that forms the foreground image;
an updated trace information acquisition section that acquires updated trace information from an end region of the foreground image; and
a storage section that stores the trace information acquired by the trace information acquisition section, the updated trace information acquired by the updated trace information acquisition section and the new updated trace information generated by the background image generation section in association with each other.

7. The apparatus according to claim 1, further comprising:
a copy prohibition release information acquisition section that acquires copy prohibition release information from the foreground image,
a determination section that determines a copy prohibition release condition in accordance with the copy prohibition release information acquired by the copy prohibition release information acquisition section, and
a control section that controls so that the image forming section forms the composite image generated by the combining section when the determination section releases copy prohibition.

8. The apparatus according to claim 7, wherein the control section controls so that the image forming section does not form the composite image if the determination section does not releaser the copy prohibition.

9. The apparatus according to claim 1, wherein the foreground image is obtained by reading an image formed on an original.

10. An image forming apparatus comprising:
the image processing apparatus according to claim 1; and
the image forming section that forms the composite image output from the image processing apparatus on a recording medium.

11. The apparatus according to claim 10, further comprising:
an interface section that receives image data through a network; and
a control section that generates the foreground image based on the received image data.

12. The apparatus according to claim 10, further comprising:
an image reading section that reads an image formed on an original to output the foreground image.

13. An image processing method comprising:
generating a background image containing new updated trace information that identifies at least one of an image processing apparatus to which an image formation instruction is provided and a user who instructs the image processing apparatus to form an image;
combining the background image generated by the background image generation section with a foreground image to generate a composite image; and
outputting the composite image to an image forming section that forms an image on a recording medium, wherein:
the generating comprises arranging the updated trace information in an end region of the background image.

14. A non-transitory computer readable medium storing a program causing a computer to execute image processing, the image processing comprising:
generating a background image containing new updated trace information that identifies at least one of an image processing apparatus to which an image formation instruction is provided and a user who instructs the image processing apparatus to form an image;
combining the background image generated by the background image generation section with a foreground image to generate a composite image; and
outputting the composite image to an image forming section that forms an image on a recording medium, wherein:
the generating comprises arranging the updated trace information in an end region of the background image.

* * * * *